Jan. 17, 1939.

F. M. LANG

Re. 20,979

TUBE CUTTER

Original Filed Feb. 24, 1936

Frank M Lang
INVENTOR.

Reissued Jan. 17, 1939

Re. 20,979

UNITED STATES PATENT OFFICE 20,979

TUBE CUTTER

Frank M. Lang, West Allis, Wis., assignor to The Imperial Brass Manufacturing Company, Chicago, Ill.

Original No. 2,065,138, dated December 22, 1936, Serial No. 65,303, February 24, 1936. Application for reissue January 3, 1938, Serial No. 183,163

4 Claims. (Cl. 30—102)

My invention relates to cutting tools and more particularly to tools for cutting pipe and tubing.

While tools have been in quite general use in which a disc or other cutter is employed to cut into the circumference of a pipe or tube as the tool is rotated around it, limitations have developed in the use and application of cutters working on this principle. Most cutters are provided with a long slotted recess to hold the tube during the cutting operation. The long recess, while forming a firm grip for the pipe or tube to be cut, can be used successfully only where the pipe or tube is in a straight piece. In the installation of copper tubing for pipe lines it is the customary practice to couple the end of the tubing by use of a flare. The tube, being somewhat ductile, is flared larger at the end, the flare being made of such dimension as will fit around a plug or male fitting, and a female fitting, or nut having been previously slipped over the tube clamps the flared part to the plug. It frequently happens that when an installation of this kind is made using copper tubing, the tube is likely to be cut off leaving little or nothing to spare. If then the joint should be defective and a new one needed, the length of tube might not be long enough to remake the connection should the tube be cut off an inch or two shorter. This is a limitation in tube cutters now in use in which the recess wherein the tube rests is somewhat a long one for structural reasons and where, in order to cut a flared tube, the flare must protrude from the recess and the cut be made on the tube at some distance from the end. Thus the difficulty arises when a close fit is encountered.

To overcome this drawback I have for the object of my invention the provision of a new and improved cutter for tubing.

Another object is to provide a new and improved tube cutter which will cut the flare from the ends of tubing.

A further object is to provide a new and improved tube cutter which can be used with tubing which has already been flared so that the tube may be cut preparatory to making a new flare with no more than a minimum length of tube wasted.

Another object is to provide a new and improved tube cutter with a guide so that when used to cut a piece of flared tubing the flare is used with the guide to position the tubing in the tool in order that the cut may be made at a set distance from the flared end of the tube.

Still another object of my device is to provide a tube cutter having a tube holding recess in the body and a cutting element or disc operable transversely of said recess and manually adjustable, the recess being apertured for the reception of the flanged end of a tube so as to set the flanged end in a certain position adjacent the plane of the cutting element in order that only a minimum end of the tube need be wasted by the cut.

In pursuance of the foregoing objects I aim to provide a tube cutter for flanged tubing wherein the tube can be set in a certain position in the device so as to make a minimum cut from the end of the tubing.

Further objects and advantages will become apparent as the description proceeds, taken in connection with the drawing which forms a part of this specification.

As shown in the drawing—

Figure 1:
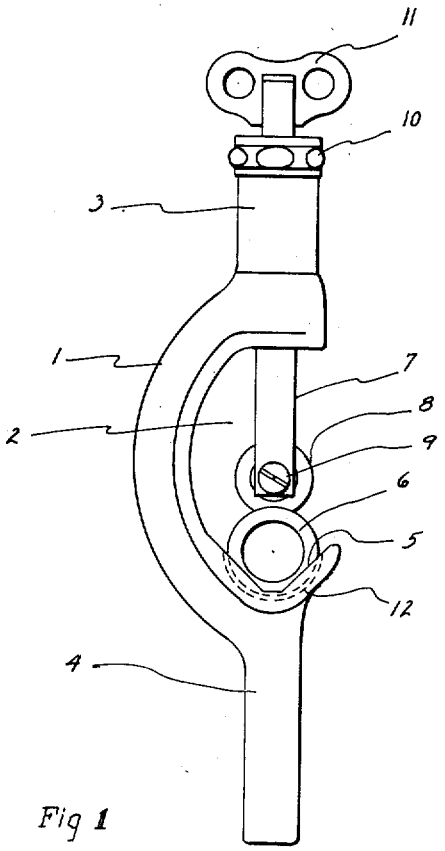
Fig. 1 is a side view of my device with a tube inserted ready for cutting.

While my invention is susceptible of embodiment in many different forms, I have shown in the drawing and will herein describe in detail one such embodiment together with a modification with the understanding that the present disclosure is to be considered an exemplification of the principles of my device and not intended to limit the invention to the embodiment shown. The scope of the invention is pointed out in the appended claims.

The operation explained in accordance with the embodiment illustrated consists of retracting the cutting disc a sufficient distance, inserting the tubing into the V-shaped recess as shown and then forcing the cutting disc into position against it. The entire tool is then rotated circumferentially around the tube and as the cutting proceeds the cutting disc may be forced steadily deeper into the tube by turning the handle until finally the tube is cut through.

Figure 2:
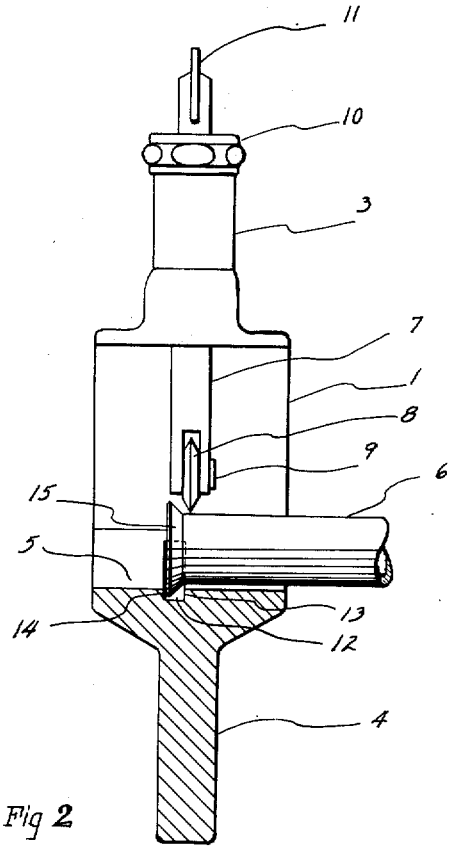
Fig. 2 is a front view with the bottom portion in section showing the tube positioned in the slotted recess.

In the embodiment shown the body 1 has an open central portion 2, an upward extending boss 3 and a lower projection 4 which may be used for a reamer. The tube holder in the bottom side of the central portion 2 is here shown as a V-shaped recess 5 extending across the tool as viewed in Fig. 2 in which a tube 6 may be secured during the cutting operation. The use of the V-shape, or any approximately similar shape allows the tool to be used with a variety of sized tubes. Thus a tube, regardless of size will always bear directly on the sides of the recess when in position and may be at a greater or less distance from the bottom of the V-shaped recess, depending on the diameter of the tube.

Mounted in the boss 3 are parts of the cutting element which will not be described in detail but consist in general of an arm 7 having mounted on the inner end a cutting disc 8 secured in the split end of the arm 7 by the screw 9 wherein it may be allowed to rotate. A screw within the boss 3 operates in the conventional manner and is secured therein by the nut 10 and surmounted by the handle. By turning the handle 11 the cutting arm may be extended into or out of contact with the tube 6. The tool as described up to this point is readily operable to cut a straight length of tubing at any point where the entire length can lie flat in the recess.

Should there be a flanged end on the tubing and a short cut desired, some means should be provided to accommodate the flare and permit the body of the tube to lie flat in the V-shaped recess. Accordingly a transverse slot or aperture 12 is formed in the V-shaped recess, here shown to be semicircular in shape but which may be V or otherwise shaped so as to satisfy the purpose described. The slot is conventionally made of depth and width greater than the size of the maximum flare to be encountered so that the body of the tube will always rest freely on the sides of the V-recess, without being tilted up by contact of the flare with the bottom or sides of the recess, or with the bottom of the transverse slot. It is convenient also to locate the slot very near the transverse cutting plane of the cutting disc 8 so that as little as possible of the straight tube need be wasted. In placing the inside edge 13 of the slot 12 slightly to one side of the plane of the disc 8, a bearing under the edge of the disc is maintained on all sides. The opposite edge 14 of the slot may be located at a distance from the plane of the disc edge such that when the flanged end 15 of the tube 6 is pressed snugly against it the tube can be held in position until the cut is started and the cut may by this means be made as near the flared end of the tube as practicable. Naturally the other edge 13 can be used as a guide for smaller flared tubes where less waste still is desired.

Figure 3:
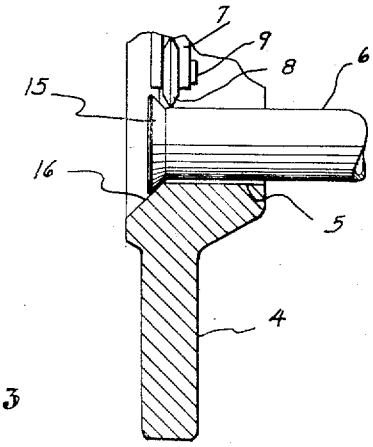
Fig. 3 shows an alternative construction wherein one wall of the slot has been removed.

In the modification shown in Fig. 3 a transverse slot 16 is used which merges with the open end of the tube recess 5 and is tapered at approximately the same degree as the taper of the flare. The base of slot 16, which in this modification is actually an open declivity is located slightly to the left of the cutting plane of the disc 8 so that for tubing of all sizes the sloping side of the slot 16 will permit the tube to be firmly placed in position against it to allow an extremely short cut to be taken from the flared end of the tube.

It will be evident that the tool can be used practically to cut the flare alone from the end of the tube operating thus to sacrifice no more than an absolute minimum from original length of the tube with an attendant saving of trouble and difficulty. There is therefore a cutter designed to operate in the customary manner but with the unique added advantages which make it a universal tool.

I claim as my invention:

1. In a cutter for flared tubing, a body for holding the tube having an open central portion and a transverse cutting member mounted at one side thereof adapted to be manually fed into cutting position comprising an arm extendible into said body, a cutting disc on the inside end of said arm operable in a transverse plane and rotatable means at the outside end for adjusting and feeding said arm into position, said body having at another side of said open central portion a substantially V-shaped longitudinal means for holding tubing formed with a portion of the walls thereof positioned under the cutting member to provide a solid support for said tube during a cutting operation and another portion of the walls removed to form a transverse circular slot adapted to receive the flare, the sides of said slot being positioned adjacent and slightly to one side of the plane of said disc forming a stop to prevent positioning of the flared portion under the disc.

2. In a cutter for flared tubing a body having an open central portion, a transverse cutting member mounted on the body at one end comprising an arm extendible into said central portion, a cutting element on one end of said arm operable in a transverse plane, means associated with the arm for extending it into position and a rotatable member at the other end for operating the extending means, said central portion having a longitudinal declevity with portions of the walls thereof positioned under the cutting element forming a solid support for a tube at the cutting area during a cutting operation and a portion of said walls forming said declevity having a transverse slot formed therein with the sides thereof positioned at one side only of the plane of the cutting element a slight distance therefrom to accommodate a projection on the tube adjacent the cutting area.

3. In a cutter for flared tubing a body for holding the tubing having an open central portion and a transverse cutting member at one end thereof, said cutting member comprising a carrying member extendible into said body, a cutting element on said member operable in a transverse plane, and feeding means on said carrying member for adjusting and feeding said cutting member into position, said body having a declevity at another end of said central portion comprising longitudinal walls providing a solid support for tubing opposite the cutting member and having formed therein a transverse depression adapted to position a flare on the tube at one side only of the cutting element with the sides of said depression positioned on the same side of the plane of said cutting element a slight distance therefrom.

4. A cutter for tubing comprising a body having a central opening formed therein and a longitudinal tube receiving declevity including tube supporting walls at one side of the opening, a cutting element mounted on another side of the opening, operable in a transverse plane, and an adjustable feeding device for drawing said declevity and said cutting element together into tube cutting position, said walls having portions thereof positioned opposite the cutting element forming a solid support for the tube at the cutting area and having a transverse depression adapted to position a projection on the tube at one side only of the cutting element and formed in a portion of the walls adjacent the solid portion and positioned slightly to one side of the plane of the cutting element.

FRANK M. LANG.